US008316012B2

(12) United States Patent
Abouzied et al.

(10) Patent No.: US 8,316,012 B2
(45) Date of Patent: Nov. 20, 2012

(54) APPARATUS AND METHOD FOR FACILITATING CONTINUOUS QUERYING OF MULTI-DIMENSIONAL DATA STREAMS

(75) Inventors: Azza Mohamed Nagib Mohamed Shawkat Abdellatif Abouzied, Halifax (CA); Jacob Slonim, Bedford (CA); Michael Joseph McAllister, Halifax (CA)

(73) Assignee: SAP France S.A., Paris (FR)

( * ) Notice: Subject to any disclaimer, the term of this patent is extended or adjusted under 35 U.S.C. 154(b) by 447 days.

(21) Appl. No.: 12/163,972

(22) Filed: Jun. 27, 2008

(65) Prior Publication Data
US 2009/0327257 A1    Dec. 31, 2009

(51) Int. Cl.
G06F 7/00    (2006.01)
G06F 17/30    (2006.01)
(52) U.S. Cl. ...................................................... 707/718
(58) Field of Classification Search ................... 707/718
See application file for complete search history.

(56) References Cited

U.S. PATENT DOCUMENTS

| | | | | |
|---|---|---|---|---|
| 5,495,600 | A * | 2/1996 | Terry et al. | 707/754 |
| 7,149,983 | B1 * | 12/2006 | Robertson et al. | 715/810 |
| 7,194,483 | B1 * | 3/2007 | Mohan et al. | 707/600 |
| 2004/0088158 | A1 * | 5/2004 | Sheu et al. | 704/9 |
| 2005/0015368 | A1 * | 1/2005 | Payton et al. | 707/4 |
| 2007/0288635 | A1 * | 12/2007 | Gu et al. | 709/226 |

OTHER PUBLICATIONS

D. J. Abadi, et al., "The Design of the Borealis Stream Processing Engine," 2nd Biennial Conference on Innovative Data Systems Research, Asilomar, CA, Jan. 2005.
D. J. Abadi, et al., "Aurora: A New Model and Architecture for Data Stream Management," The Very Large Data Bases (VLDB) Journal, 12(2):120-139, 2003.
A. Arasu, et al., "STREAM: The Stanford Data Stream Management System," downloaded from http://infolab.stanford.edu/stream, (also click on the link and print the page), 2004.
A. Arasu, et al., "The CQL Continuous Query Language: Semantic Foundations and Query Execution," downloaded from http://infolab.stanford.edu/stream, 2005.
Y. D. Cai, et al., "Maids: Mining Alarming Incidents from Data Streams," Proceedings of the 2004 ACM SIGMOD International Conference on Management of Data, p. 919-920, New York, NY, 2004.
S. Chandrasekaran, et al., "TelegraphCQ: Continuous Dataflow Processing for an Uncertain World," Proceedings of the 2003 CIDR Conference, Jan. 2003.
J. Han, et al., "Stream Cube: An Architecture for Multi-Dimensional Analysis of Data Streams," Distributed and Parallel Databases: Special Issue on Data Warehousing and Data Streams, Springer-Verlag, Sep. 2005.
S. Madden, et al., "Continuously Adaptive Continuous Queries Over Streams," Proceedings of the 2002 ACM SIGMOD International Conference on Management of Data, p. 49-60, New York, NY, 2002.
M. Stonebraker, et al., "The 8 Requirements of Real-Time Stream Processing," 21st International Conference on Data Engineering, Tokyo, Japan, Apr. 2005.

* cited by examiner

*Primary Examiner* — Van Oberly
(74) *Attorney, Agent, or Firm* — Mintz, Levin, Cohn, Ferris, Glovsky and Popeo, P.C.

(57) ABSTRACT

A computer readable storage medium comprises executable instructions to provide a query interface for formulating continuous queries of multi-dimensional data streams. The query interface is populated to generate a plurality of continuous queries. The plurality of continuous queries are executed. The plurality of continuous queries are modified at run-time.

23 Claims, 21 Drawing Sheets

905 — Sample dimension frame specification

```
SELECT SUM(PRICE * QUANTITY)
  FROM SALES
  TILT 15MIN-1HOUR-1DAY-7DAY
  GROUPING REGION, PRODUCT_CATEGORY;
```

Description

910 — This frame examines point of sales (pos) stream data and sums the dollar value of different sales. This dollar value is equivalent to the price of a product multiplied by the number of units sold.

How to use this frame?

915 — You need to select a window over which total sales will be calculated. The window has two values the range which is the total period over which sales are examined and slide which specifies how often the window moves and compute the total sales over its range. You also need to select the grouping dimension you are interested in.

Query as presented to the end-user

920 —
```
SELECT SUM(PRICE * QUANTITY)
  FROM SALES
  OVER choice_1   OFFSET choice_1
  GROUP BY choice_2;
```

1105 — Sample filter frame specification

1120 —
SELECT employees.id, employees.first_name, employees.last_name, sales.store_id, SUM(sales.price * sales.quantity)
  FROM employees, sales
  OVER 24 HOURS OFFSET 12 HOURS
  WHERE <expression> AND
  employees.id (CUMULATIVE)==
  sales.employee_id (OVER 24 HOURS OFFSET 12 HOURS)
  GROUP BY employees.id
  HAVING SUM(sales.price * sales.quantity) <sub-expression>;

Description

1110 — This frame provides a list of employees and the total dollar value of sales made for each employee in the last 24 hours (or day) every 12 hours. These results could help you select a list of employees to audit for adhering to legal guidelines when selling special products such as tobacco or alcohol or to determine employee productivity.

How to use this frame?

1115 — You could use this query to specify criteria to filter employees of interest before the summation or use the sum value to filter out employees of interest by completing the sub-expression after 'HAVING'. For example, filling in the expression field with "employees.store_id == 24" will return the sales of all employees within that store. You could provide multiple criteria by joining each predicate with an 'AND' or 'OR' clause. For example, "sales.sub-cat == 'alcohol' OR sales.sub-cat == 'tobacco'" will provide a list of all employees that sold alcohol and tobacco in the last 24 hours.

| Sample fixed query |
|---|
| SELECT product_id, product_sales, product_complaints FROM(<br>(SELECT product_id, SUM(sales.quantity) AS product_sales<br> FROM sales<br> JUMP 1 DAY OFFSET 1 DAY<br> WHERE product_status == 'new' OR product_status == 'experimental'<br> GROUP BY sales.product_id),<br> SELECT COUNT(complaints.id) AS product_complaints<br> FROM complaints<br> JUMP 1 DAY OFFSET 1 DAY<br> GROUP BY complaints.product_id)); |
| Description |
| The query provides a daily view of sales of a product against complaints raised against it by customers. This helps with correlating customer satisfaction against product demand or popularity. |
| Task motivating the query |
| When a new product is introduced we could predict its future sales by examining how satisfied customers are by it. We measure customer satisfaction by the number of complaints made against the product. I use this query to correlate sales and complaints. I store the output at my delta client and every week I graph the values of products of interest. |

*FIG. 13*

Query Frame: Total sales across regions, product_type and time

This frame examines point of sales (pos) stream data and sums the dollar value of different sales. This dollar value is equivalent to the price of a product multiplied by the number of units sold. ⎯1410

SELECT SUM(PRICE * QUANTITY) FROM SALES OVER choice 1 OFFSET choice 1 GROUP BY choice 2; ⎯1415

⎯1405

How to use this frame?

You need to select a window over which total sales will be calculated. The window has two values:
(i) the range which is the total period over which sales are examined and
(ii) slide which specifies how often the window moves and compute the total sales over its range. You also need to select the grouping dimension you are interested in.

You can learn more about the two dimensions: <u>region</u> and <u>product_type</u> by following the links.

choice 1
- ○ last 15 minutes every minute
- ○ last 1 hour every 15 minutes
- ○ last 1 day every 1 hour
- ○ last 7 days every 1 day choice 2
- ○ by city and product sub-category
- ○ by country and product sub-category
- ○ by city and product category
- ○ by country and product category
- ○ by city
- ○ by product sub-category
- ○ by country
- ○ by product category
- ○ all

[ Generate Query ] [ Reset ]

*FIG. 14*

Title and description help users determine whether the query or frame matches their search request Simple search by keywords — 1805

Find queries or frames using keywords: [ Go ] — 1810
Advanced search
Search Keywords: customer satisfaction

1800

| Title & Description | Frame | % Relevant |
|---|---|---|
| Customer satisfaction against product sales for new or experimental products<br><br>The query provides a daily view of sales of a product against complaints raised against it by customers. This helps with correlating customer satisfaction against product demand or popularity. | No | 90% |
| Measure customer satisfaction across specific product categories or regions<br><br>You could use this frame to measure the total number of complaints raised in different regions or different product types over varying time ranges. | Dimension | 90% |
| Market demographics<br><br>View sales for a specific product across customer properties such as age, gender, region loyality (i.e. when the customer started buying.) All measures are based on customers that use loyality card for shopping. | Dimension, Filter | 60% |
| Employee satisfaction as a measure of employee-owned company shares<br><br>I wrote this query to determine employee satisfaction by examining trends in enrollment in 'own a share' program. This measure is imperfect but does form a simple indicator. | No | 40% |

Queries & Frames sorted by relevance to search keywords — 1815

Details such as whether the retrieved result is a fixed query or frame and how much modification is allowed on the frame — 1820

Advanced Search Criteria — 1905

☑ Include frames    ☑ Include fixed queries

Description keywords: customer satisfaction

Task keywords: measure correlation report

Query designed in any of the following departments:

| Sales |
| Marketing |
| Management |
| Finance and Accounting |
| Customer Service |

Query designed by user having any of the following roles:

| All roles |
| Data analyst |
| Sales agent |
| Accountants |
| Customer support staff |

Search    Reset

1900

1910 — Search could be made more precise by specifying different keywords for task and description (relevant when including fixed queries in search)

User could choose to view only frames or only complete queries

1915 — User could view queries written by others in similar roles or in their department These details change depending on whether a fixed query or frame is selected ⟶ 2020

2000 ⟶

User could click on data sources to get more information on each source

2005 ⟶

| Query |
|---|
| Customer satisfaction against product sales for new or experimental products |

| |
|---|
| *SELECT* product id, product sales, product complaints *FROM*(*(SELECT* product id, SUM(sales.quantity) *AS* product sales *FROM* sales *JUMP* 1 DAY *OFFSET* 1 DAY *WHERE* product.type == 'new' OR product.type == 'experimental' *GROUP BY* sales.product id), ( *SELECT* COUNT(complaints.id) *AS* product complaints *FROM* complaints *JUMP* 1 DAY *OFFSET* 1 DAY *GROUP BY* complaints.product id)); |

| Description |
|---|
| The query provides a daily view of sales of a product against complaints raised against it by customers. This helps with correlating customer satisfaction against product demand or popularity. |

| Task |
|---|
| When a new product is introduced we could predict its future sales by examining how satisfied customers are by it. We measure customer satisfaction by the number of complaints made against the product. I use this query to correlate sales and complaints. I store the output at my delta client and every week I graph the values of products of interest. |

| Data sources |
|---|
| sales |
| complaints |

| Users who shared similar queries |
|---|
| None |

⟶ 2010

Different tasks or descriptions written by other users that created a similar query could be browsed through this list Active users: 1

Back to search results

Query is in use

Use fixed query

Statistics of query use are also available ⟶ 2015

APPARATUS AND METHOD FOR FACILITATING CONTINUOUS QUERYING OF MULTI-DIMENSIONAL DATA STREAMS

CROSS-REFERENCE TO RELATED APPLICATIONS

This application is related to the commonly owned patent application entitled "Apparatus and Method for Dynamically Materializing a Multi-Dimensional Stream Cube" filed the same day as the present application, application Ser. No. 12/163,952, the contents of which are hereby incorporated by reference.

FIELD OF THE INVENTION

This invention relates generally to the continuous querying of multi-dimensional data streams. More particularly, this invention relates to techniques for facilitating the formulation of continuous queries in a just-in-time Business Activity Monitoring application.

BACKGROUND OF THE INVENTION

Business Intelligence ("BI") generally refers to a category of software systems and applications used to improve business enterprise decision-making and governance. These software tools provide techniques for analyzing and leveraging enterprise applications and data, ranging from both historical to current real-time data and business events. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, such as relational, Online Transaction Processing ("OLTP") and Online Analytic Processing ("OLAP") databases, and performance management applications to provide business metrics, dashboards, and scorecards, as well as best-practice analysis techniques for gaining business insights.

Traditional BI tools have supported long-term decision planning by transforming transactional data into summaries about the organization's operations over a period of time. While this information is valuable to decision makers, it remains an after-the-fact analysis with latencies from data arrival to report production. The information needs of operational decision-making cannot be addressed entirely by traditional BI technologies. Effective operational decision-making requires little delay between the occurrence of a business event and its detection or reporting. Just-in-time, finer grained information is necessary to enable decision makers to detect opportunities or problems as they occur. BI technologies are not designed to provide just-in-time analysis.

Business Activity Monitoring ("BAM") systems and applications are the set of technologies that fill in this gap. BAM applications provide right-time or just-in-time reporting, analysis, and alerting of significant business events, accomplished by gathering data from multiple applications. Right-time differs from real-time analysis. In right-time analysis, the main goal is to signal opportunities or problems within a time frame in which decision making has a significant value. Real-time analysis requires that opportunities or problems be signaled in a pre-specified, very short time-frame, even if the alert has the same decision-making value a day after the occurrence of the events that triggered it. Real-time operation, although preferred, is not essential. The goal is to analyze and signal opportunities or problems as early as possible to allow decision making to occur while the data is fresh and of significance. BAM applications therefore encourage proactive decision making.

Business events, transactional data or messages are modeled in BAM applications as "data streams". Data streams are time-ordered sequences of data that represent business events detected from multiple applications and sources (both internal such as messaging services and external such as news feeds). In contrast to BI applications, BAM applications are designed to support continuous queries that process data streams without necessarily archiving data.

Continuous queries, also referred to as standing or long-running queries, are queries that evaluate continuously as new data arrive on data streams. Generally, continuous queries define time-based processing windows on data and provide approximations based on data collected in a most recent time window.

From a business perspective, BAM users may need to write continuous queries to monitor current events whenever unexpected opportunities or problems warrant such monitoring. They may also need to modify the continuous queries dynamically and on-the-fly. For example, a continuous query may monitor total sales in the last five minutes. Every five minutes, a BAM user, such as a sale manager, receives the total sales made in the last five minutes. Such a query enables the sales manager to detect trends or patterns in the data (e.g., an increase or decrease in total sales) and make effective decisions if sales are dropping, the sales manager may need to investigate the productivity of the sales employees.

Previous work for formulating and processing continuous queries has focused on the development of continuous query languages and continuous query systems, such as, for example, the Continuous Query Language ("CQL") supported by the STREAM system developed at Stanford University, Stanford, Calif. (http://infolab.stanford.edu/stream), and the StreaQuel language, supported by the TelegraphCQ system developed at the University of California at Berkeley, Berkeley, Calif. (http://telegraph.berkeley.edu), among others.

These continuous query languages, although enabling users to monitor continuous data streams, are SQL-like languages with additional windowing constructs. As such, they are not suitable for use in BAM systems in which a low query formulation effort is desired. Query formulation effort describes the overall effort of users to create and execute a query (e.g., a continuous query). The total effort required may be defined as the sum of the initial training effort to learn the query language and the repeated efforts to perform productive tasks on it. BAM users, in particular, may not be able to write or learn to write continuous queries directly in a BAM system using the currently-available continuous query languages.

BAM users are typically any employee within the business organization (at any management level) that is required to make decisions based on the analysis of current business events or data. BAM users therefore range from technical to non-technical. Since multi-dimensional data streams are created from events signaled from different applications and data sources, it is unlikely that such users are familiar with the data sources and applications to determine how to properly set up continuous queries to monitor the data. If an end-user needs to spend time to correctly formulate a continuous query or ask assistance from support staff to do so, the benefit of just-in-time data processing provided by a BAM system is lost.

With BAM users ranging from the non-technical to the technical, their capabilities to formulate queries typically depends on four factors, namely: (1) their familiarity with programming (or GUI) concepts; (2) their frequency of system usage; (3) their application knowledge (e.g., the precision of the users' conceptual model about the structure and contents of the data stream sources, their data schema, and queries); and (4) their range of operations (the different kinds of queries a user requires such as aggregation, summarization, or monitoring queries).

FIG. 1 illustrates different user types according to these four factors. Typical BAM users are novice/skilled, casual/managerial users. Such users can benefit from a BAM system with a low query formulation effort. Casual users 105, for example, have simple, straightforward information requests and do not typically require the full power of a query language. Managerial users 110, however, have complicated information requests such as summarizing data or trend analysis but cannot afford a high training effort or a high query formulation effort.

Previous work for assisting users with query formulation and reducing their training and repeated efforts has included the development of query interfaces, such as query-by-example and query-by-forms. Query-by-example is a graphical query interface for use with relational databases. It was designed to require users to know very little in order to get started and to reduce the knowledge that the user subsequently has to learn in order to understand and use the whole language. Users are exposed to the fields and structures of relational tables within the databases and formulate queries by filling in a table with examples of the data they would like to retrieve. An example of a query-by-example is illustrated in FIG. 2. Query-by-example 200 filters all sales with a value greater than a thousand dollars. Table 205 illustrates the fields in the sales schema the user is interested in and table 210 illustrates a manipulation of the fields in table 200.

Form-based interfaces, also known as query-by-forms, are a natural extension of query-by-example. Form interfaces have inherent advantages over query-by-example because (1) users are familiar with forms (data is collected, stored, retrieved and updated in terms of common business forms, which are widely used and understood, e.g., invoices, receipts, checks, etc.), and (2) forms capture tasks—they represent the data from the user's perspective (rather than from the database perspective). An exemplary form interface for finding all sales with a value greater than a thousand dollars is illustrated in FIG. 3. With query-by-forms, unlike query-by-example, users are not required to define how price and quantity need to be manipulated to retrieve the value of a sale.

Since query-by-example and query-by-form provide query interfaces for databases, they are only designed for precise querying of static data. They are therefore not suitable for use in BAM systems, where the queries are continuous. Currently-available continuous query languages, however, have no such interfaces. Users are required to spend significant resources in learning the particular languages before they can formulate continuous queries with them.

Currently-available continuous query languages are also not suitable for dynamic modification on-the-fly, as any changes in the continuous queries using such languages may require the queries to be converted into a sequence of operators before the queries can be executed. In a just-in-time operation environment, delays in formulating a continuous query due to, for example, reliance on IT staff to formulate or modify the query as needed, result in BAM users missing right-time information of business opportunities or problems collected by continuous querying of business events.

Accordingly, it would be desirable to provide techniques for improving the usability of a BAM system. In particular, it would be highly desirable to provide techniques to facilitate the formulation of continuous queries in a just-in-time BAM system.

SUMMARY OF THE INVENTION

The invention includes a computer readable storage medium with executable instructions to provide a query interface for formulating continuous queries of multi-dimensional data streams. The query interface is populated to generate a plurality of continuous queries. The plurality of continuous queries are executed. The plurality of continuous queries are modified at run-time.

The invention also includes a compute readable storage medium with executable instructions to provide a plurality of query frames for generating continuous queries. The plurality of query frames are stored in a query catalog. Query frames matching search criteria are searched for in the query catalog. The query frames matching the search criteria are populated to generate populated query frames. The populated query frames are converted into continuous queries.

The invention further includes a method for facilitating the formulation of continuous queries. A plurality of query frames for formulating continuous queries are provided. A graphical user interface for populating one or more of the plurality of query frames to generate populated query frames is provided. The populated query frames are stored in a query catalog. The populated query frames are converted into continuous queries. The continuous queries are executed.

BRIEF DESCRIPTION OF THE DRAWINGS

The invention is more fully appreciated in connection with the following detailed description taken in conjunction with the accompanying drawings, in which like reference characters refer to like parts throughout, and in which:

FIG. 9 illustrates an exemplary dimension query frame in accordance with an embodiment of the invention;

FIG. 11 illustrates an exemplary filter query frame in accordance with an embodiment of the invention;

FIG. 13 illustrates an exemplary complete query in accordance with an embodiment of the invention;

FIG. 14 illustrates an exemplary screen shot of a graphical user interface for filling in the dimension query frame of FIG. 9 in accordance with an embodiment of the invention;

FIG. 18 illustrates an exemplary screen shot of search engine graphical user interface for searching for complete queries or query frames in accordance with an embodiment of the invention;

FIG. 19 illustrates an exemplary screen shot of an advanced search engine graphical user interface for searching for complete queries or query frames in accordance with an embodiment of the invention;

FIG. 20 illustrates an exemplary search result in accordance with an embodiment of the invention; and FIG. 21 illustrates an exemplary screen shot of a graphical user interface for an executing query.

DETAILED DESCRIPTION OF THE INVENTION

Figure 1:
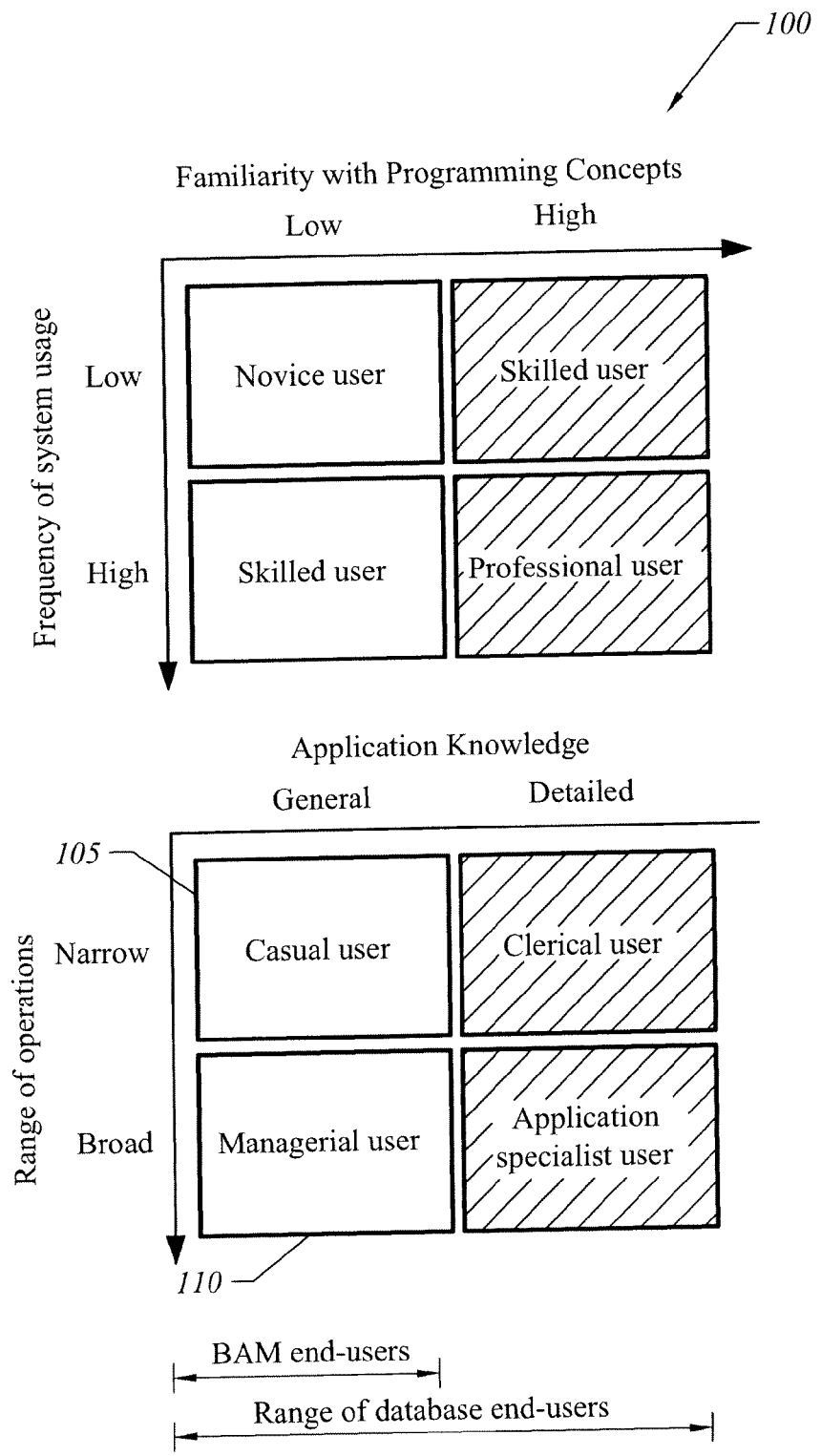
FIG. 1 illustrates different types of BAM users.
Figure 2:
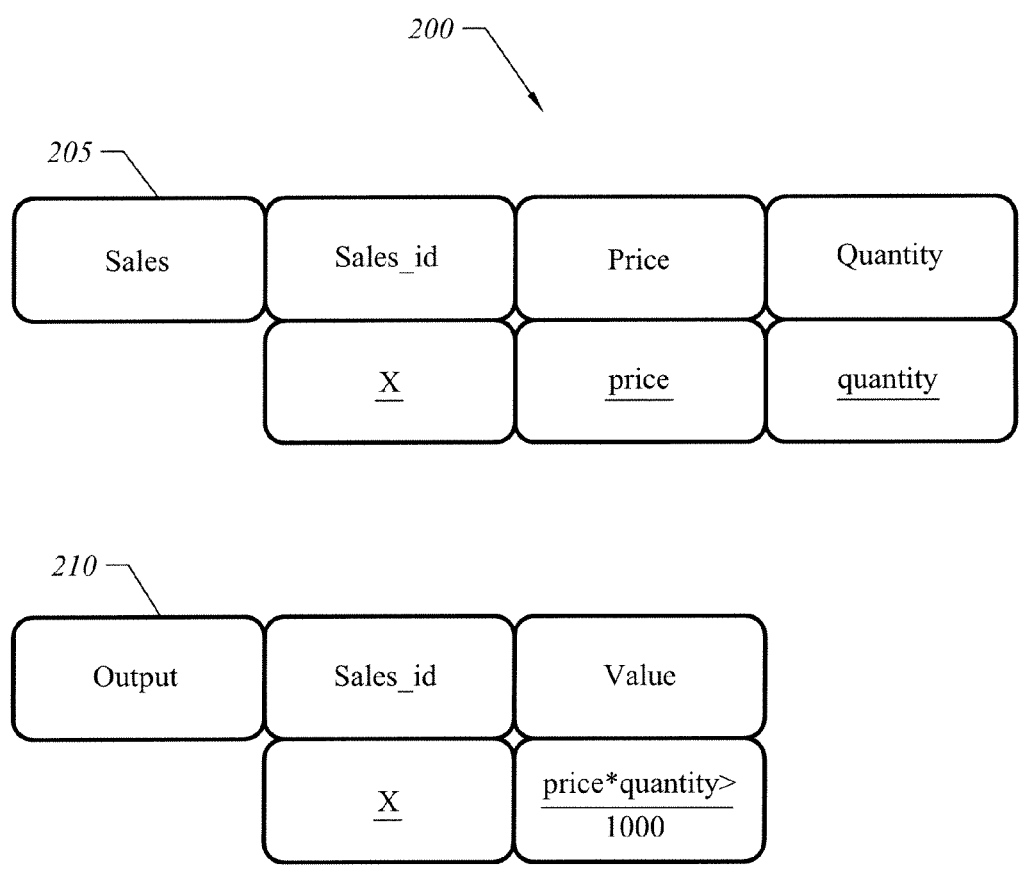
FIG. 2 illustrates a prior art query-by-example interface.
Figure 3:
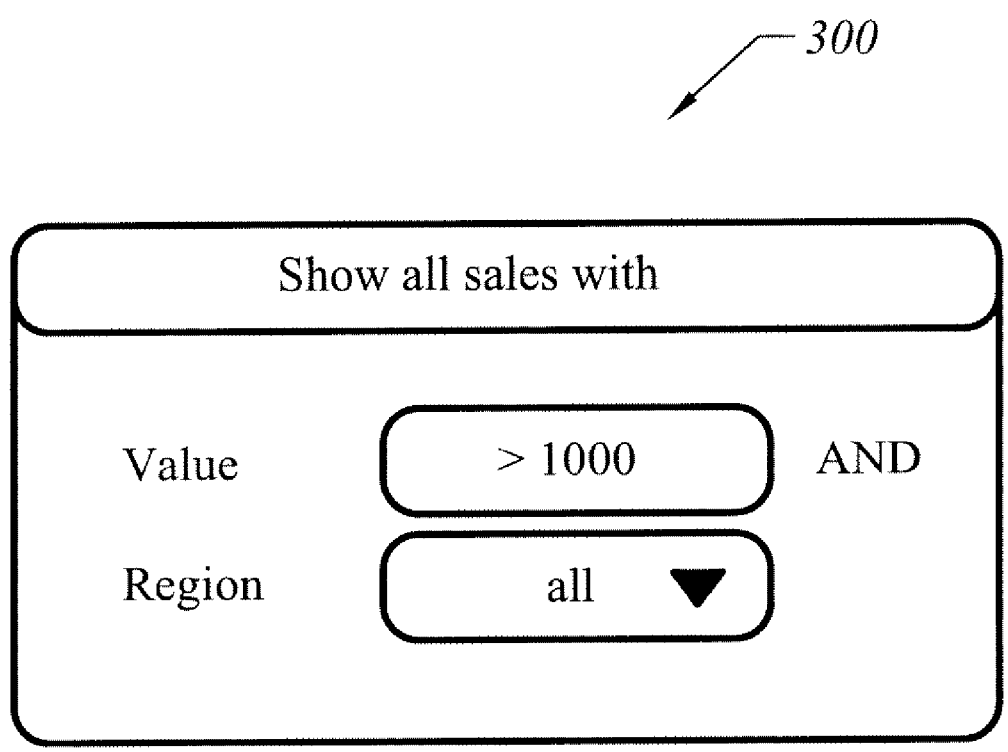
FIG. 3 illustrates a prior art query-by-forms interface.

The present invention provides a system, method, software arrangement, and computer readable storage medium for facilitating users' formulation of continuous queries. Continuous queries, as generally used herein, are queries that are evaluated continuously as data arrive on data streams. Data streams, as generally used herein, are time-ordered sequences of current and dynamically changing data that represent business events detected from multiple applications and sources (both internal such as messaging services and external such as news feeds).

According to an embodiment of the invention, a query interface that is intuitive for BAM users—technical and non-technical users alike—and designed for continuous querying of data streams is provided. The query interface, according to an embodiment of the invention, is provided in the form of query frames. A query frame, as generally used herein, is an outline or skeleton query with gaps that are filled in or populated by a user at query-time and later modified at run-time. Unlike the prior art, static query-by-example and query-by-forms interfaces described above, query frames enable dynamic modification of queries at run-time. For example, users may use query frames to specify the dimensions, abstraction levels, data sources, etc., they are interested in without a need for the BAM system to re-parse, re-plan, and re-optimize the queries.

In one embodiment, users fill in or populate different types of query frames at query-time to generate populated query frames. The populated query frames are converted into continuous queries written in a SQL-like query language. The continuous queries have continuous query plans with query operators that may be modified at run-time. Each query frame includes a number of sections that may be populated by a user, including a query section with gaps to be filled by the user to generate a continuous query and meta-sections with descriptive textual information that enables users to understand the purpose of the continuous query specified in the query section.

For example, consider a BAM user interested in monitoring total sales over a time window in a given region. The BAM user may populate a total sales query frame to specify the time window (e.g., every hour) and the region (e.g., city) over which to calculate the total sales. Upon populating the query frame, a continuous query to monitor the sales data is executed. The user may modify the time window and the region at any time while the continuous query is being executed. In contrast with currently-available continuous query languages and systems, the continuous query generated from the query frame populated by the user may be modified at run-time without having to execute a new query.

For novice users that have little or no experience with query formulation using a SQL-like query language, query frames therefore provide an intuitive technique for writing continuous queries. The descriptive textual information in the meta-sections guides the users through filling in or populating the gaps in the query frames to formulate continuous queries. With query frames, users are able to formulate continuous queries without dependence on IT staff.

According to an embodiment of the invention, a catalog of continuous queries (and query frames) written by users and/or data analysts is provided. A search engine to search the catalog is also provided to enable user collaboration through query sharing. Each query frame is associated with descriptive metadata. The descriptive metadata is used to match a set of search criteria entered by the users in the search engine.

Figure 4:
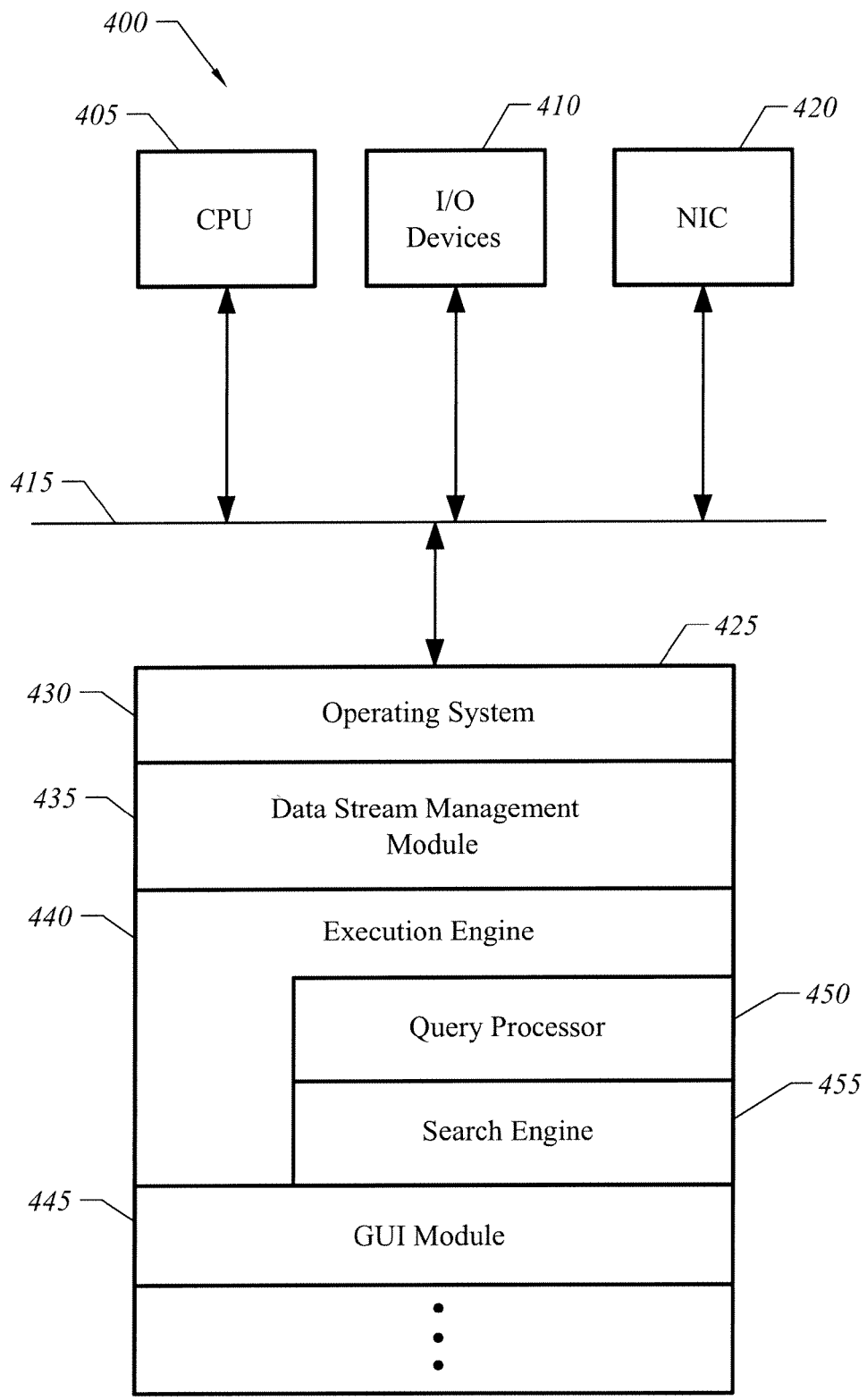
FIG. 4 illustrates a computer constructed in accordance with an embodiment of the invention.

FIG. 4 illustrates a computer in accordance with an embodiment of the invention. Computer 400 includes standard components, including a Central Processing Unit ("CPU") 405 and input/output devices 410, which are linked by a bus 415. Input/output devices 410 may include a keyboard, mouse, display screen, monitor, printer, and the like. Network Interface Card ("NIC") 420 may also be connected to the bus 415. NIC 420 provides connectivity to a wired or a wireless network (not shown), thereby allowing computer 400 to operate in a networked environment. Memory 425 is also connected to the bus 415. In one exemplary embodiment, memory 425 stores one or more of the following modules: an Operating System module 430, a Data Stream Management module 435, an Execution Engine 440, and a GUI module 445. Operating System module 430 may include instructions for handling various system services, such as file services or for performing hardware dependant tasks. Data Stream Management module 435 may include executable instructions for managing different data sources, receiving data from those data sources, and producing structured, time-stamped, multi-dimensional data streams from the received data.

According to an embodiment of the invention, Data Stream Managing module 435 sends the multi-dimensional data streams to Execution Engine 440 for processing. Execution Engine 440 includes a Query Processor 450 for processing, planning, and optimizing continuous queries on multi-dimensional data streams arriving from Data Stream Management module 435. Query Processor 450 may operate in conjunction with GUI module 445, which relies upon standard techniques to produce graphical components of a graphical user interface ("GUI"), e.g., windows, icons, buttons, menu and the like, for formulating, searching, and executing continuous queries and query frames and displaying results of currently executing continuous queries. The GUI may also be used by data analysts to describe the schema of different data sources and the parameters required to convert the data received from those data sources into the structured, time-stamped, multi-dimensional data streams.

According to an embodiment of the invention, users formulate queries on the GUI with the use of query frames. Users are presented with different types of query frames, described in more detail herein below, and fill in or populate the gaps in the query frames to formulate a query. Each query frame includes meta-sections with descriptive textual information that enables users to understand the purpose of the continuous query specified in the query frame. The queries are then executed by Execution Engine 440 and the results of the query are displayed on the GUI.

Execution Engine 440 also includes a Search Engine 455 for searching for query frames and continuous queries. Search Engine 455 has a GUI that enables users to search for query frames using a variety of search criteria, described in more detail herein below. The search criteria is matched to descriptive metadata associated to the query frames and continuous queries. The query frames and continuous queries with associated metadata matching the search criteria are then displayed in the GUI.

According to an embodiment of the invention, Execution Engine 440 also includes query operators (not shown) for operating on the multi-dimensional data streams arriving on Execution Engine 440 from Data Stream Management module 435 at run-time. An example of such query operators is provided in the commonly-owned patent application entitled "Apparatus and Method for Dynamically Materializing a Multi-Dimensional Stream Cube," application Ser. No. 12/163,952, the contents of which are hereby incorporated by reference.

It is appreciated that the executable modules stored in memory 425 are exemplary. It is also appreciated that the functions of the modules may be combined. In addition, the functions of the modules need not be performed on a single computer. Instead, the functions may be distributed across a network, if desired.

Indeed, the invention may be commonly implemented in a client-server environment with various components being implemented at the client-side and/or the server-side, side, or, alternatively, in a peer-to-peer or other such networking environment. For example, one of ordinary skill in the art appreciates that the functions of modules 435-445 may be performed at computer 400 or at a server connected to computer 400. In one exemplary embodiment, some or all of the functions of modules 435-445 may be performed at computer 400. In another exemplary embodiment, some or all of the functions of modules 435-445 may be performed at a server connected to computer 400. As appreciated by those of ordinary skill in the art, it is the functions of the invention that are significant, not where they are performed or the specific manner in which they are performed.

As also appreciated by one of ordinary skill in the art, the functions of modules 435-445 may be performed at a web server hosting a BAM web site. Users may access the BAM web site to access, manage, and analyze continuously arriving data streams.

Figure 5:
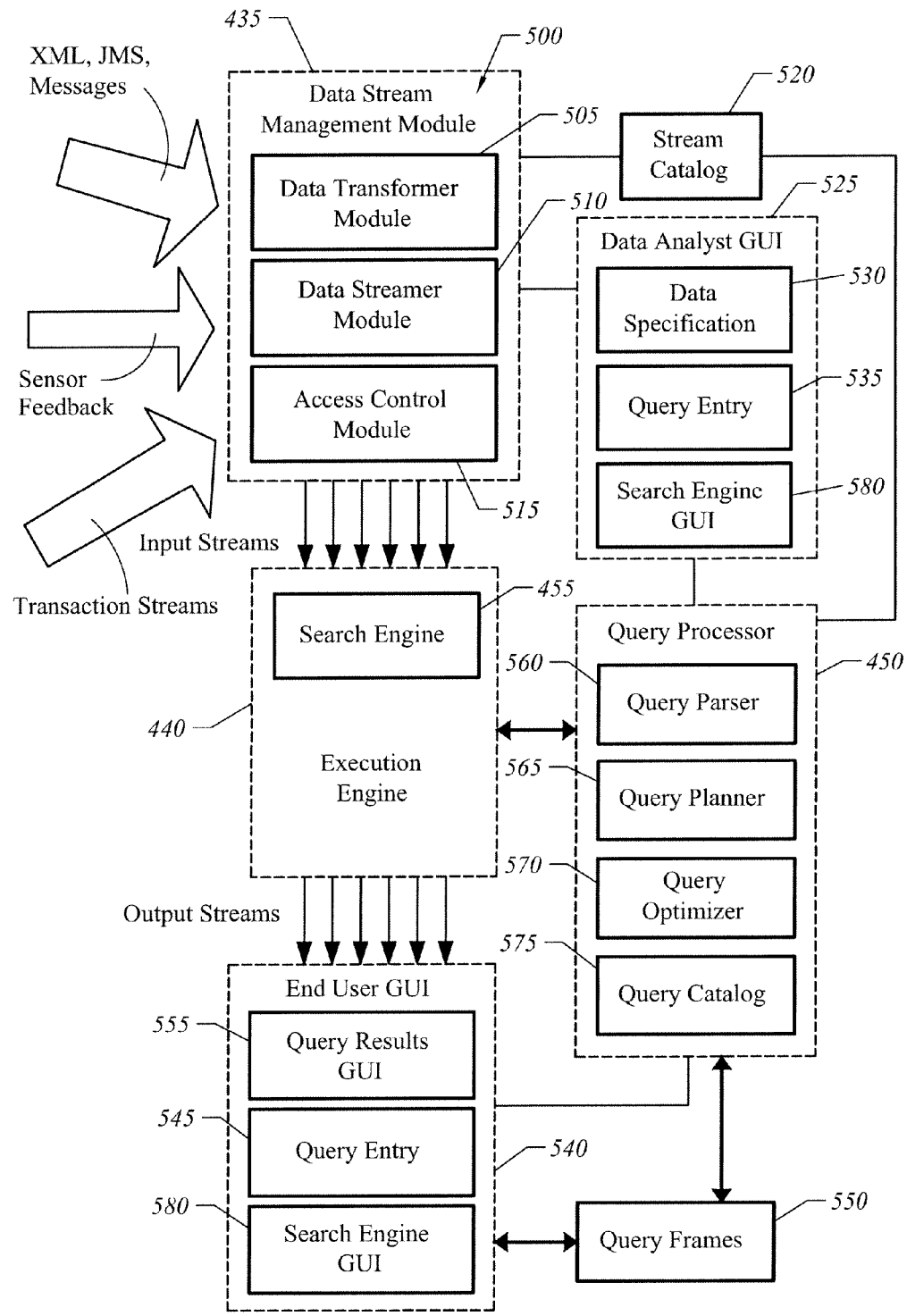
FIG. 5 illustrates a BAM architecture in which embodiments of the invention may operate.

Referring now to FIG. 5, a BAM architecture in which embodiments of the invention may operate is described. BAM architecture 500 illustrates the different modules of computer 400 and the relationships between them. Data Stream Management module 435 is the entry point of BAM architecture 500, listening to multiple data sources and producing structured, time-stamped data streams from data received from those data sources. The data sources can include both pull and push data sources. Pull data sources require Data Stream Management module 435 to actively poll the data sources for data, while push data sources send push data events, e.g., transactions and messages, to Data Stream Management module 435.

Data Stream Management module 435 may include a Data Transformer module 505, a Data Streamer module 510, and an Access Control module 515. The Data Transformer module 505 is responsible for converting the data received from the multiple data sources into the structured data streams. The Data Streamer module 510 sends the data streams into Execution Engine 440 for processing and adds a timestamp to each tuple in the data streams marking the time the tuple is released to Execution Engine 440. In one embodiment, Data Streamer module 510 may also control the flow rate of the data streams into Execution Engine 440. Access Control module 515 controls users' access to data streams or fields within the data streams.

A Stream Catalog 520 interacts with Data Stream Management module 435 to describe the schema (i.e., the dimensions, attributes, and measures) of the multiple data sources and the parameters required to convert the received data into the structured, time-stamped data streams. Data analysts may define the dimension hierarchies using GUI module 445. GUI module 445 may include a Data Analyst GUI 525 for use by data analysts to describe the schema (including their dimension hierarchies) of the multiple data sources and the parameters required to convert the received data into the structured, time-stamped data streams.

Data Analyst GUI 525 may include a Data Specification module 530 for defining the schema and the parameters required for generating the structured, time-stamped data streams. Data Analyst GUI 525 may also include a Query Entry module 535 to enable data analysts to define sample query frames for continuously querying the multi-dimensional data streams. Users may define continuous queries or populate query frames using Query Entry module 545 within End User GUI 540, also generated by GUI module 445. Query Results GUI 555 displays the query results to users.

According to an embodiment of the invention, users formulate continuous queries by using different types of query frames 550. As described in more detail herein below, query frames 550 are skeleton or outline queries with gaps that are filled in or populated by a user at run-time. End User GUI 540 enables users to fill in or populate query frames 550 with, for example, user selections from a menu of choices, user generated text, or any other input for filling in or populating the gaps in the query frames. As described above query frames 550 contain a number of sections, including a query section with gaps to be filled in by a user to specify a continuous query and meta-sections with descriptive textual information describing the query frames.

Continuous queries formulated with query frames 550 in Query Entry modules 535 and 545 are processed by Query Processor 450, where they are parsed in Query Parser 560, planned in Query Planner 565, and optimized in Query Optimizer 570. After processing, the continuous queries are executed by Execution Engine 440.

According to an embodiment of the invention, Execution Engine 440 includes Search Engine 455 for searching for query frames 550 and for searching for continuous queries (e.g., continuous queries generated from populated query frames). A query catalog 575 is maintained in Query Processor 450 to store continuous queries and query frames 550 that are filled in or populated by users and/or data analysts using Query Entry modules 535 and 545. As described in more detail herein below, Search Engine 455 is accessed by Search Engine GUI 580 that enables users to search for query frames using a variety of search criteria. The search criteria is matched to descriptive metadata associated with query frames 550. The query frames 550 with associated metadata matching the search criteria are then displayed in the Search Engine GUI 580.

It is appreciated by one of ordinary skill in the art that the modules of BAM architecture 500 illustrated in FIG. 5 are shown for purposes of illustration only. Additional modules (not shown) may be included within BAM architecture 500 or the displayed modules may be changed and or/combined. For example, Query Processor 450 may be a module within Execution Engine 440. It is also appreciated by one of ordinary skill in the art that BAM architecture 500 may be a client-server, peer-to-peer, or other type of architecture. For example, End User GUI 540 may be used by users in a client computer to formulate continuous queries, which may be executed in a server computer.

Figure 6:
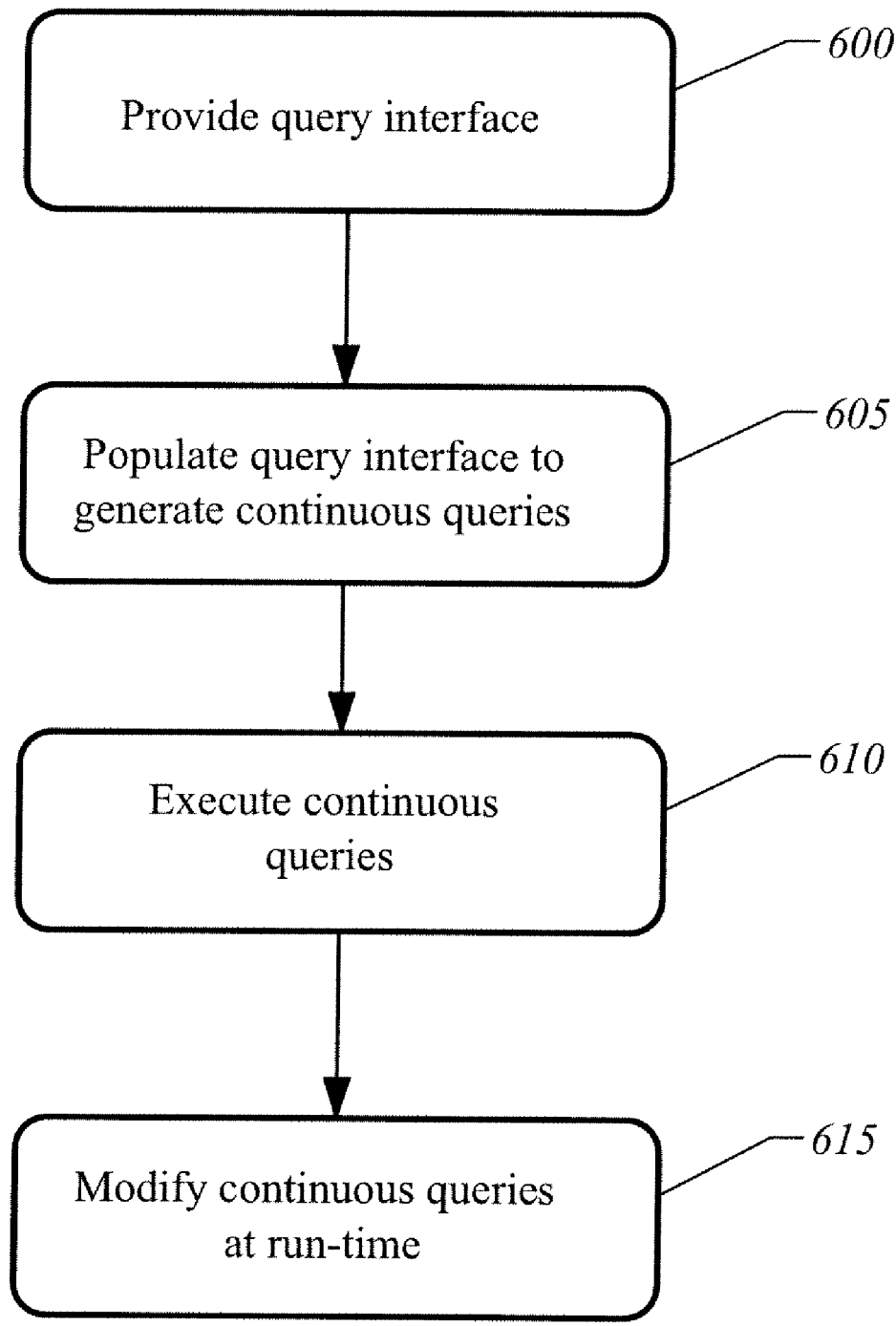
FIG. 6 illustrates a flow chart for facilitating the formulation of continuous queries in accordance with an embodiment of the invention.

Referring now to FIG. 6, a flow chart for facilitating the formulation of continuous queries in accordance with an embodiment of the invention is described. First, a query interface for formulating continuous queries to multi-dimensional data streams is provided (600). Next, the query interface is populated to generate continuous queries written in a query language and having continuous query plans (605). Lastly, the continuous queries are executed (610) and modified at run-time as desired (615). In one embodiment, the query language may be a SQL-like query language. As described in more detail herein below, the query interface may be in the form of query frames.

Figure 7:
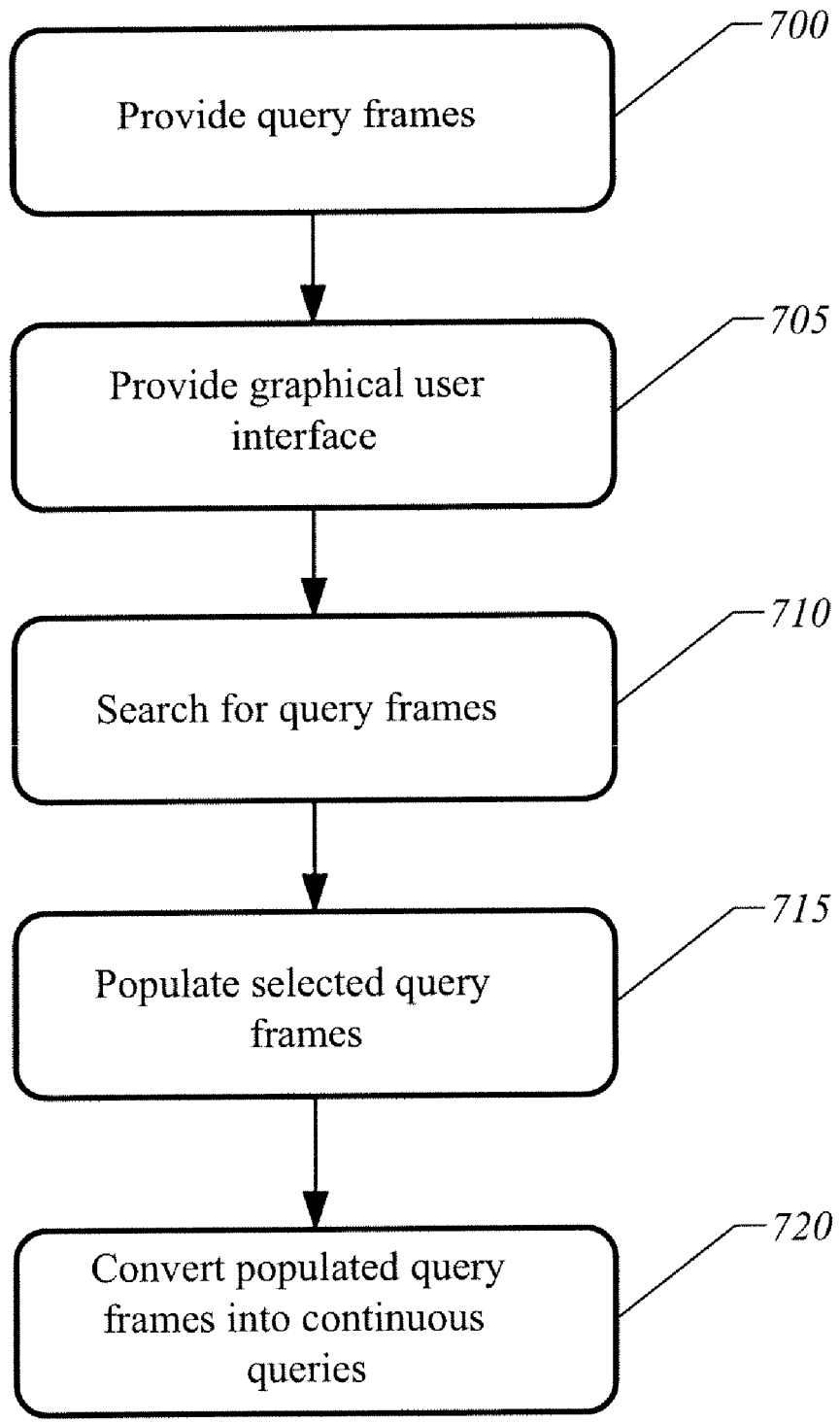
FIG. 7 illustrates a flow chart for formulating continuous queries using query frames in accordance with an embodiment of the invention.

FIG. 7 illustrates a flow chart for formulating continuous queries using query frames in accordance with an embodiment of the invention. First, different types of query frames are provided for formulating continuous queries (700). The query frames may be stored in a query catalog, e.g., Query Catalog 575. A graphical user interface is also provided for presenting the different types of query frames to users (705). The query frames include various meta-sections with descriptive textual information that enables users to understand the purpose of the continuous query to be specified in the query frames. The query frames also include a query section with gaps that may be filled in or populated by the users to specify continuous queries as desired.

Next, users use a search engine (e.g., Search Engine 460) to search for query frames that match a search criteria, as described in more detail herein below (710). For example, a BAM user interested in generating a continuous query to monitor total sales may use the search engine to conduct a keyword search with the keyword "total sales." The search engine returns search results that include query frames specifying continuous queries for monitoring total sales. The search results may include empty or partially populated query frames for the user to fill out and generate the desired continuous query.

The query frames are then populated by the users (715). The users may populate the gaps in the query frames with, for example, user selections from a menu of choices, user generated text, or any other input for filling in or populating the query frames. The query frames may be dynamically populated in run-time, thereby providing users with the flexibility needed for querying multi-dimensional data streams arriving from multiple data sources. Lastly, each one of the populated query frames is converted into continuous queries that may be modified at run-time (720).

Figure 8:
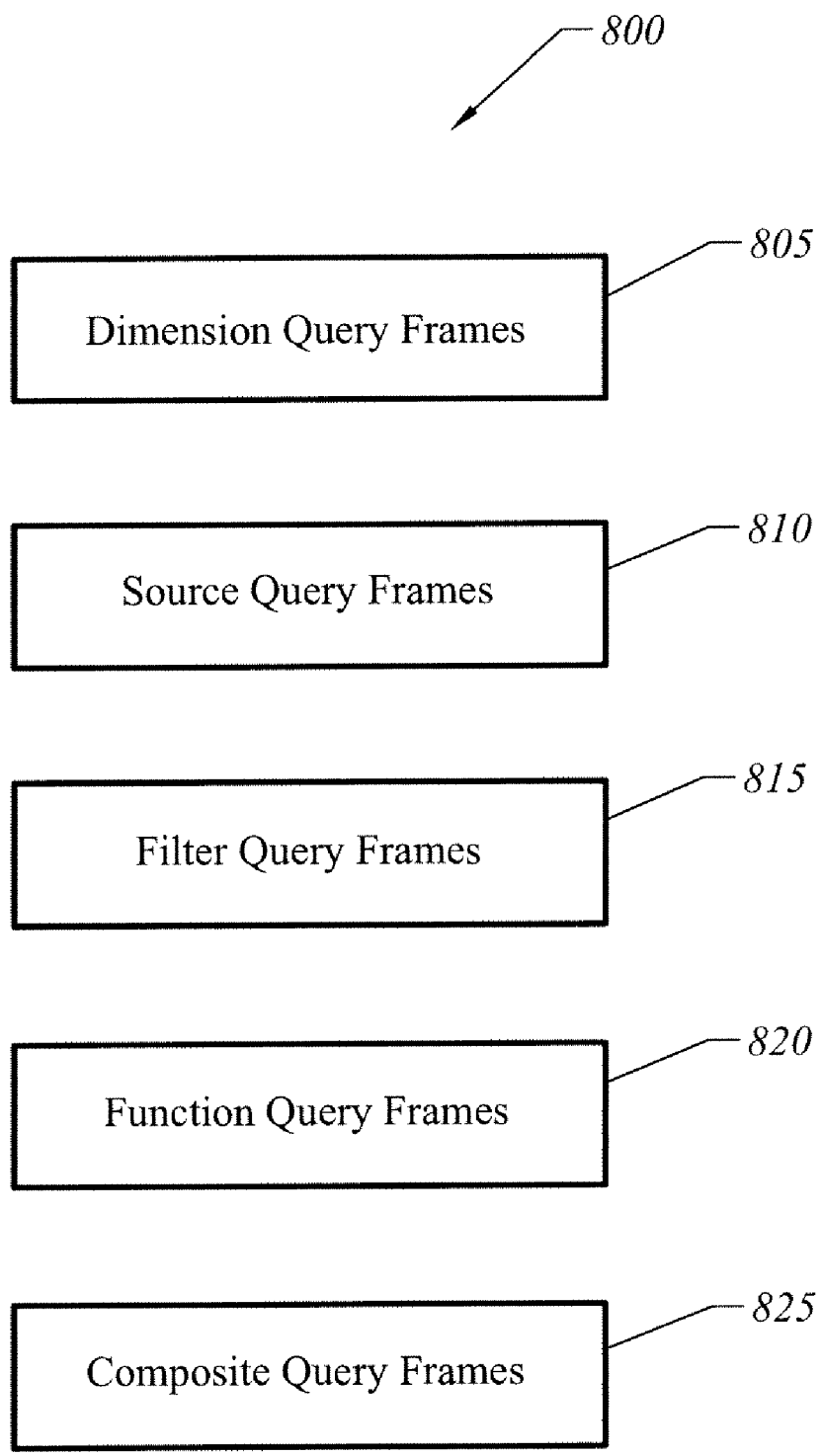
FIG. 8 illustrates a schematic diagram showing different types of query frames in accordance with an embodiment of the invention.
Figure 10:
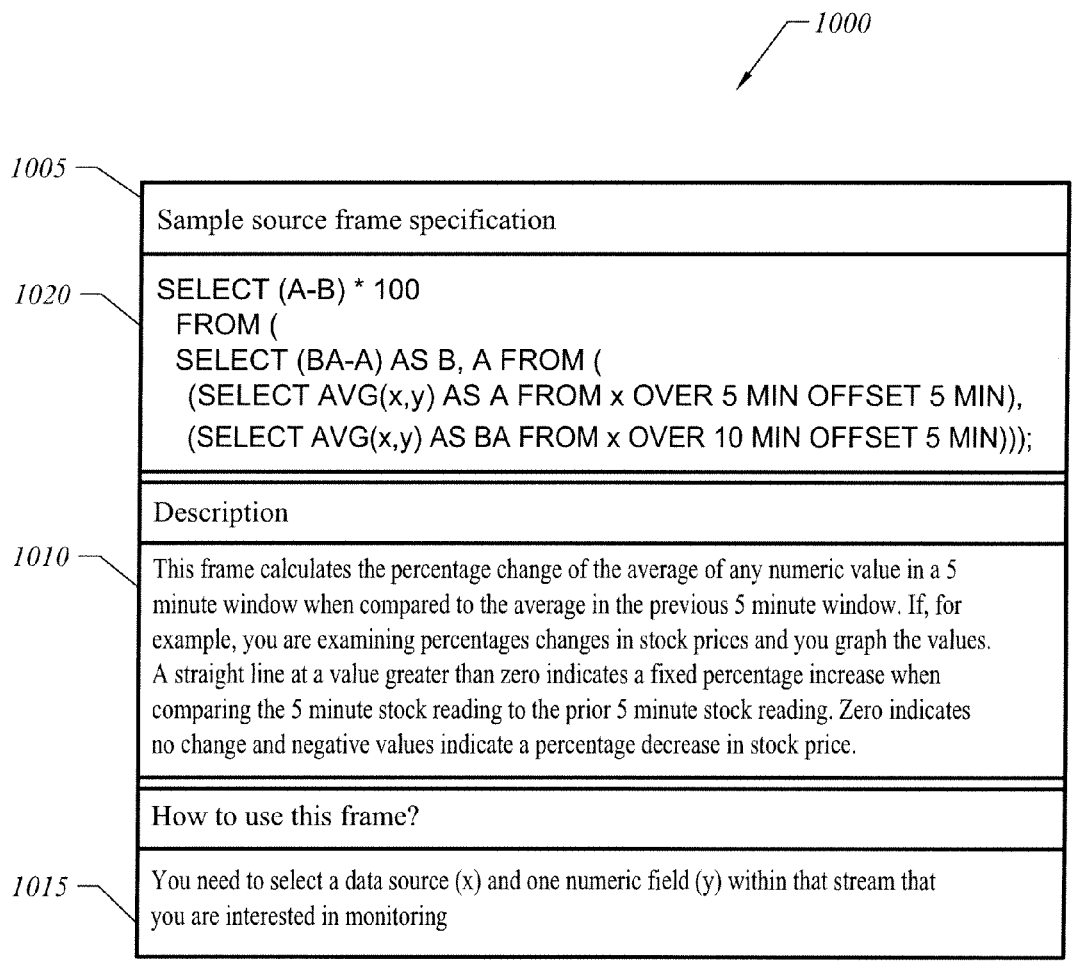
FIG. 10 illustrates an exemplary source query frame in accordance with an embodiment of the invention.
Figure 12:
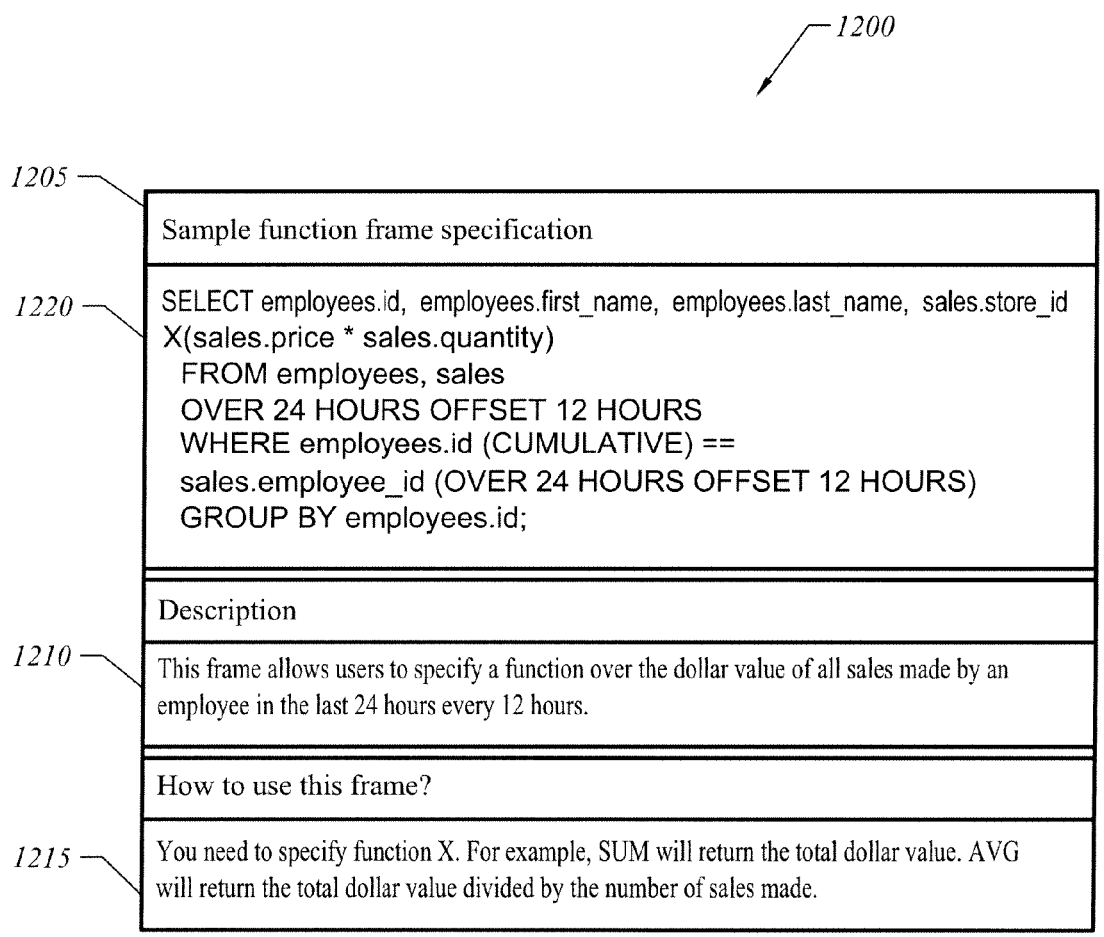
FIG. 12 illustrates an exemplary function query frame in accordance with an embodiment of the invention.

Referring now to FIG. 8, a schematic diagram showing different types of query frames in accordance with an embodiment of the invention is described. Query frames 800 may include different types, such as, but not limited to, dimension query frames 805, source query frames 810, filter query frames 815, function query frames 820, and composite query frames 825. Each one of types 805-825 determines the nature of the gaps that may be filled in or populated by a user.

Dimension query frames 805 enable users to specify the dimensions and abstraction levels for an aggregation query. Source query frames 810 allow users to specify a data source and dimensions within the data source that the users are interested in monitoring. Filter query frames 815 allow users to specify criteria (e.g., a Boolean predicate) to filter out certain tuples of a given multi-dimensional data stream. Function query frames 820 allow users to specify the actual operation being carried out on a given data source. Composite query frames 825 may combine two or more of query frames 805-820 into a single query frame.

It is appreciated that each one of query frames 805-825 may be an empty query frame yet to be filled in or populated by users, a partially filled in query frame with both gaps already populated and yet to be populated by users, or a completely filled query frame. It is also appreciated that a completely filled query frame is a query frame that is ready for execution.

The different types of query frames 805-820 are described in more detail herein below with reference to FIGS. 9-12. Dimension query frame 900 (FIG. 9) is an exemplary query frame that enables users to specify the dimensions and abstraction levels they are interested in for an aggregation query. Source query frame 1000 (FIG. 10) is an exemplary query frame that enables users to specify a data source and dimensions within the data source that the users are interested in monitoring. Filter query frame 1100 (FIG. 11) is an exemplary query frame that fixes both a data source and function performed by the query but allows users to specify criteria (e.g., a Boolean predicate) to filter out certain tuples of a data stream. Function query frame 1200 (FIG. 12) is an exemplary query frame that pre-defines the data sources and filters but allows users to modify the actual operation or function being carried out in the query.

Each query frame 900-1200 includes meta-sections with descriptive textual information describing the query frames. These meta-sections include a title meta-section, a description meta-section that describes the purpose of query frame, and a usage meta-section that contains instructions for users on how to populate the query frames. For example, dimension query frame 900 has title meta-section 905, description meta-section 910, and usage meta-section 915, source query frame 1000 has title meta-section 1005, description meta-section 1010, and usage meta-section 1015, filter query frame 1100 has title meta-section 1105, description meta-section 1110, and usage meta-section 1115, and function query frame 1200 has title meta-section 1205, description meta-section 1210, and usage meta-section 1215.

Users generate continuous queries with query frames 900-1200 by filling in query sections 920, 1020, 1120, and 1220, respectively. Query sections 920, 1020, 1120, and 1220 contain SQL-like query statements that are converted into continuous queries. It is appreciated that query frames 900-1200 enable users to easily generate these SQL-like query statements and modify them on-the-fly while the continuous queries are being executed. It is also appreciated that users and/or data analysts may also fill in or modify the meta-sections within query frames 900-1200 to, for example, augment or reinforce the description of the continuous queries specified in the query frames.

As appreciated by one of ordinary skill in the art, query frames 900-1200 illustrated in FIGS. 9-12 are exemplary query frames shown for illustration purposes only. Additional exemplary query frames may be used to let users formulate continuous queries.

In addition to the four types of query frames 900-1200 illustrated in FIGS. 9-12, a particular query can be formulated by users and/or data analysts. Such a query frame, referred to herein as a complete query, is a completely filled query frame that has a fixed query plan which may be changed only during query optimization. Both data analysts and end-users can create a complete query and store it in a query catalog (e.g., Query Catalog 575) maintained by the query processor (e.g., Query Processor 455). An exemplary complete query in accordance with an embodiment of the invention is illustrated in FIG. 13. Complete query 1300 illustrates a complete query created by an end-user and/or a data analyst.

As appreciated by one of ordinary skill in the art and described above, query frames 900-1300 may be displayed to users in an End User GUI 540 and to data analysts in a Data Analyst GUI 525, both created by GUI module 445. GUI 540, for example, displays different types of query frames and enables users to fill in or populate query frames with, for example, selections from a menu of choices, user generated text, or any other input for filling in or populating the query frames.

Referring now to FIG. 14, an exemplary screen shot of End User GUI 540 for filling in dimension query frame 900 in accordance with an embodiment of the invention is described. Screen shot 1400 shows meta-sections of dimension query frame 900 such as title meta-section 905, description meta-section 910, and usage meta-section 915. Users formulate a continuous query by filling in gaps 1405-1415 in the SQL-like statement 1420. Gaps 1405-1415 are filled with options 1420-1430 from a menu of choices. Once gaps 1405-1415 are populated with choices 1420-1430, the users may execute the continuous query by clicking on GUI button 1435. Users may reset the selected choices and select new ones at any time by clicking on GUI button 1440.

According to an embodiment of the invention, query frames, users, and data sources are associated with descriptive metadata. This metadata aids users and data analysts to populate query frames (e.g., the meta-sections in the query frames) as well to search for query frames in a query catalog (e.g., Query Catalog 575). Doing so enables users to reduce their training and repeated efforts, as they may learn to formulate continuous queries by checking examples of continuous queries and query frames generated by other users and/or data analysts.

In one embodiment, a search engine (e.g., Search Engine 460) is provided to enable users to search the query catalog (e.g., Query Catalog 575) using a variety of search criteria. As described in more detail herein below, the search is accomplished by matching descriptive metadata associated with the continuous queries and query frames to the search criteria.

Figure 15:
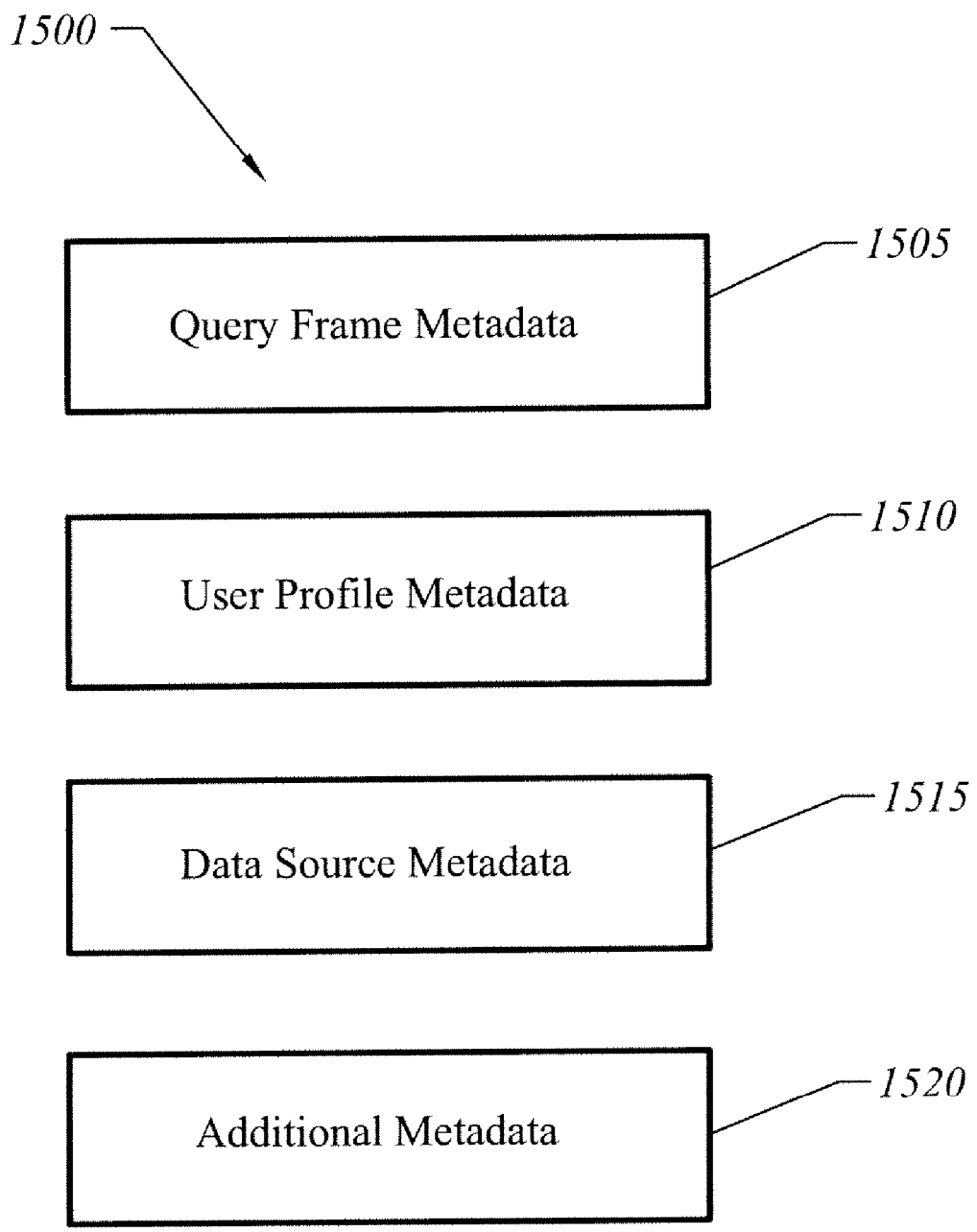
FIG. 15 illustrates a schematic diagram showing different types of metadata associated with query frames in accordance with an embodiment of the invention.

Referring now to FIG. 15, a schematic diagram showing different types of metadata associated with query frames in accordance with an embodiment of the invention is described. As appreciated by one of ordinary skill in the art, query frames, expressed in an SQL-like language, do not contain enough natural language information to enable keyword searching. For example, keywords "percentage change" do not match the mathematical expression of dividing the difference of two readings by the initial reading and multiplying by one-hundred. Therefore, query frames are augmented by natural language descriptions provided by end-users or data analysts to enable searching.

As appreciated by one of ordinary skill in the art, metadata is any additional, natural-language, textual information that describes the purpose, meaning, potential modifications, results and data sources of a query frame. With metadata, users can provide search criteria that broadly describe their query, such as, for example, "customer satisfaction", "employee productivity", and define the query operation being performed, such as "daily percentage change of sales", so that the search engine can retrieve most of the relevant queries.

Metadata 1500 may include query frame metadata 1505 extracted from meta-sections (e.g., title, description, and usage meta-sections) in the query frames, user profile metadata 1510 extracted from users' profiles, and data source metadata 1515 describing the data's origin and schema. Additional metadata 1520 describing the query frames may also be associated with them. In one embodiment, metadata 1500 is stored in XML documents. This provides flexibility in how to store this information. For example, metadata 1500 may be stored as text in directories or in an XML database.

Figure 16:
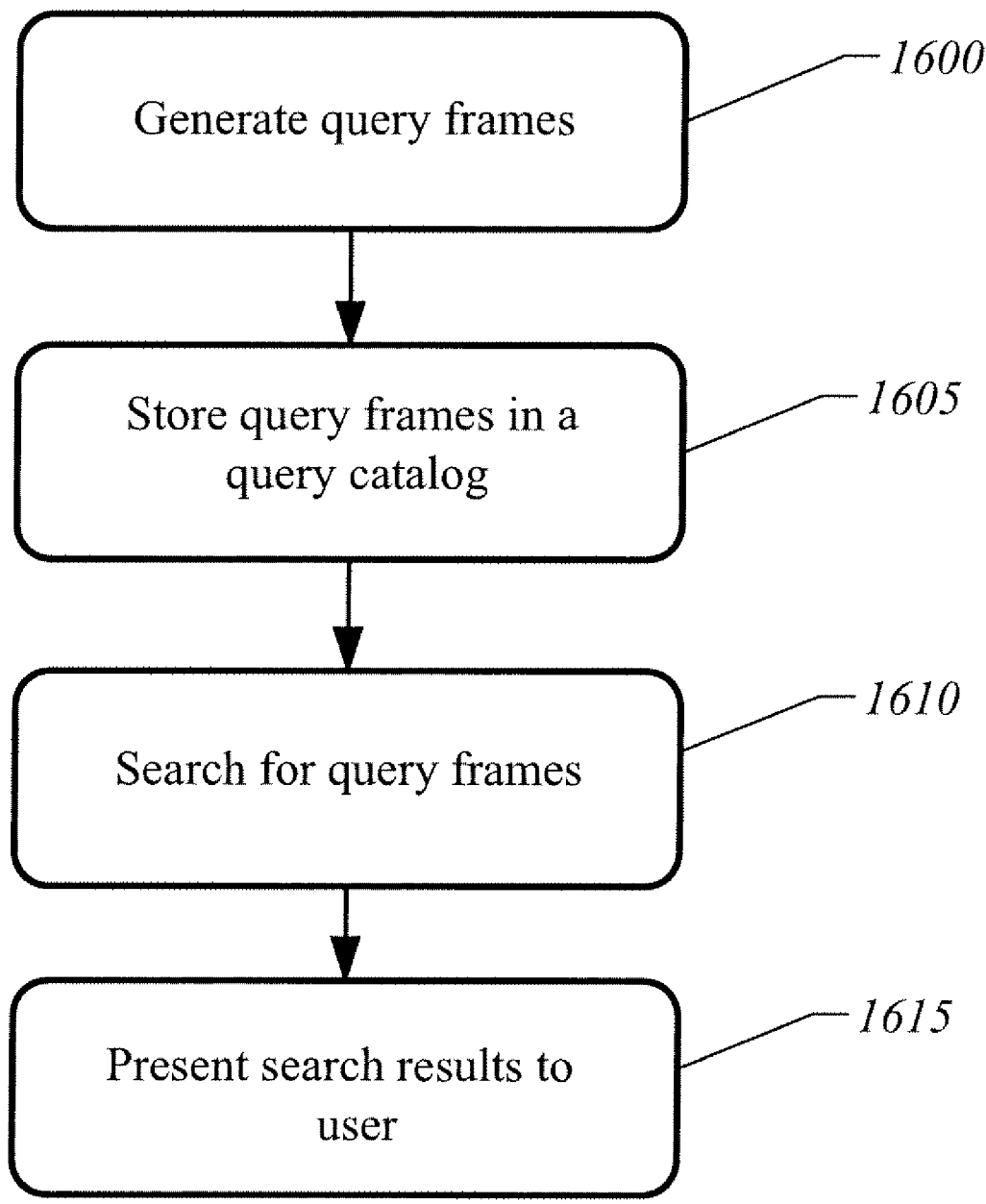
FIG. 16 illustrates a flow chart for searching for query frames in accordance with an embodiment of the invention.

Referring now to FIG. 16, a flow chart for searching for query frames in accordance with an embodiment of the invention is described. First, query frames are generated (1600) and stored in a query catalog (1605). The query frames may be searched with the use of a search engine (e.g., search engine 460) and a search engine GUI (e.g., search engine GUI 580) according to a variety of search criteria (1610). Lastly, the search results (in the form of continuous queries or query frames from the query catalog that match the search criteria) are presented to the users (1615). The users may then use the search results to formulate their own continuous queries or select one of complete queries or the query frames presented to them in the search results for execution.

According to an embodiment of the invention, search engine 460 may be any search engine for searching for electronic information (e.g., web pages, documents, query frames, etc.) according to a search criteria. For example, search engine 460 may be a search engine using the Vector Space Model ("VSM") for matching search criteria (e.g., search keywords) to the descriptive metadata describing the query frames. As appreciated by one of ordinary skill in the art, VSM builds a vector space where each term is a dimension and the metadata are represented as vectors that reside within the space. It is further appreciated that the use of the VSM for searching query frames is an exemplary use only. Other information retrieval models and search engines may be used to search query frames without deviating from the principles and scope of the invention.

Figure 17:
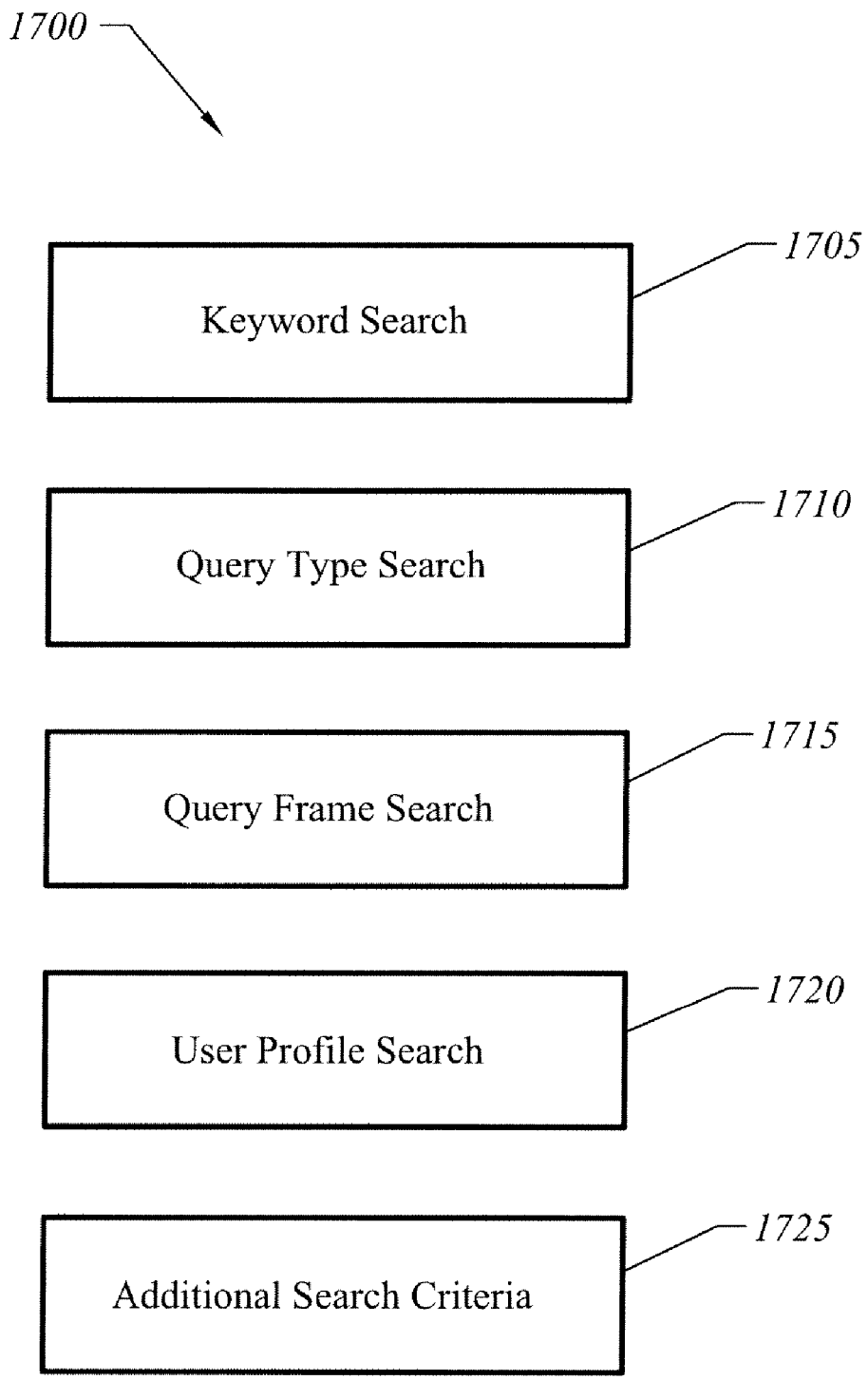
FIG. 17 illustrates a schematic diagram showing different types of search criteria in accordance with an embodiment of the invention.

Referring now to FIG. 17, a schematic diagram showing different types of search criteria in accordance with an embodiment of the invention is described. Search criteria 1700 may include, but are not limited to, a keyword search 1705, a query type search 1710, a query frame search 1715, and a user profile search 1720.

Keyword search 1705 enables users to perform a keyword-based search to search for query frames. Query type search 710 enables users to search for query frames of a particular type, e.g., dimension query frames, source query frames, filter query frames, function query frames, composite query frames, and so on. Query frame search 1715 enables users to search for query frames having a given characteristics, e.g., a given title, word in description, usage, etc. User profile search 1720 enables users to search for query frames generated by a given user or data analyst.

It is appreciated that search criteria 1700 is shown for illustration purposes only. Additional search criteria (e.g., additional search criteria 1725) may be used in search engine 460 to search for query frames.

Referring now to FIG. 18, an exemplary screen shot of a search engine graphical user interface for searching for continuous queries or query frames in accordance with an embodiment of the invention is described. Search engine GUI 1800 is a keyword-based search interface that enables users to search for query frames with associated descriptive metadata. Users type in search keywords in search window (1805) and receive search results including a list of complete queries and query frames (1810) sorted by order of relevance (1815) to the search keywords. The search results are listed by title and description to help users determine whether they indeed match their search keywords. The search results also specify whether the retrieved result is a complete query or another type of query frame. For example, query frame 1820 listed in the search results is a composite query frame of a dimension and filter query frames.

As appreciated by one of ordinary skill in the art, search relevance may be determined in a number of ways. It is also appreciated that similar or duplicate query frames may be dealt with by (1) considering each similar or duplicate query frame as unique and maintaining different entries for each query frame entry in the system, or (2) unifying the metadata for each query frame and maintaining a single query frame in the system.

As further appreciated by one of ordinary skill in the art, there are several layers at which the similarity between two query frames may be determined: (1) description layer; (2) query specification layer; and (3) query plan layer. At the description layer, two query frames may be defined as similar if they have similar descriptions and are motivated by similar tasks. The difficulty with unifying queries at this layer is that determining if two descriptions or tasks are similar requires a semantic understanding of the text that is beyond current technology.

It is appreciated that statistical or mathematical approaches may be used to approximately determine similarity at this layer For example, two descriptions may be considered similar if their metadata vectors are equal or are within a small degree of difference. Complete queries or query frames, however, may not be unified with this strategy because two users with the same task and performing the same data processing operations may write completely different queries that utilize different data sources. At this layer, similar queries or query frames may be connected in some way. Users can then browse these similar queries or query frames and get exposed to different ways of expressing a query.

At the query specification layer, two queries may be considered similar if their SQL statements are identical or substantially identical. A single query entry is made and the metadata documents are extended to contain the different descriptions and tasks that motivated the query. On viewing the query, the user is presented with all descriptions and tasks (with reference to FIG. 20 described below).

At the query plan layer, two queries may be considered similar if their optimized query plan is identical or substantially identical. This approach unifies queries that may not have identical SQL statements. The disadvantage of this approach is that users lose exposure to different styles of writing the same query. Some specifications may be easier to understand, or more compact compared to others.

Referring now to FIG. 19, an exemplary screen shot of an advanced search engine graphical user interface for searching for continuous queries or query frames in accordance with an embodiment of the invention is described. Search engine GUI 1900 is an advanced search interface that enables users to search for query frames according to a variety of search criteria (e.g., search criteria 1700) in addition to the keyword-based search described above with reference to FIG. 18. For example, users may search for query frames or fixed or complete queries (1905), for complete queries or query frames matching keywords that appear in certain query frame sections (e.g., meta-sections and query section) (1910), or for complete queries or query frames written by others at given roles and/or departments (1915). Additional search criteria may be specified as described above with reference to FIG. 17.

After the search results are presented to the users, users may click on a given complete query or query frame description (1810) that most closely resembles the complete query or query frame that they are trying to formulate. When clicking on a complete query or query frame in the search results, users are presented with additional information.

Referring now to FIG. 20, an exemplary search result in accordance with an embodiment of the invention is described. Search engine GUI screen shot 2000 shows a search result clicked on by a user. The user is provided with more information, such as data source descriptions (2005), description and task as provided by the complete query or query frame author (2010), statistics such as the number of users utilizing the complete query or query frame (2015), and so on.

As appreciated by one of ordinary skill in the art, the additional information provided for a given search result depends on whether the search result is a complete query or a query frame (2020). It is also appreciated that additional information (not shown in FIG. 20) may be displayed to the user to help the user understand the search result and reduce the user's training and repeated efforts for formulating continuous queries.

Figure 21:
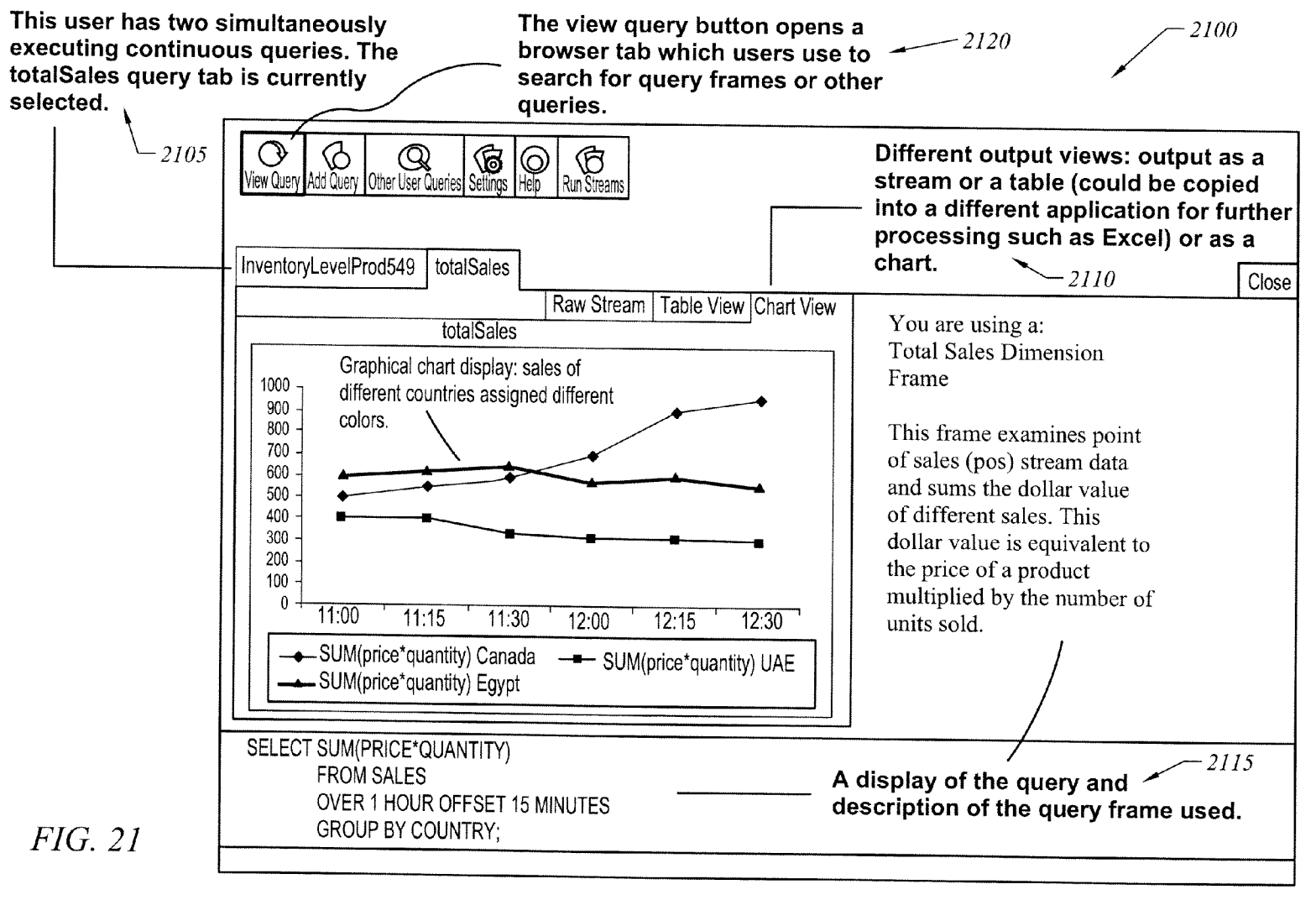

After the user views screen shot 2000, the user may execute the query. Referring now to FIG. 21, an exemplary screen shot of a graphical user interface for an executing continuous query is described. Screen shot 2100 may display, for example, the complete queries or query frames that are in execution (2105), different output views (2110), e.g., stream, table, chart, etc., description of the complete query or query frame being executed (2115), and so on. A "view query" button may also be displayed to enable users to search for additional complete queries or query frames as desired (2120).

Advantageously, the present invention enables users to significantly reduce their query formulation effort to formulate continuous queries. The use of query frames requires much less effort to train users to fill in gaps in existing queries compared to formulating queries from scratch. Usage comments and other descriptive sections (e.g., meta-sections) in the query frames guide the users through the query formulation process.

The present invention also advantageously enables users to share continuous queries with other users and further reduce their query formulation efforts. The easy-to-use search engine GUI described herein above may be used by most users without much training on their part. Experienced users may spend more effort describing queries for others, while novice users spend more effort searching for their desired query. Collaboration is therefore encouraged among all types of users.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, comprising executable instructions to:

provide a plurality of query frames for generating continuous queries of multi-dimensional data stream, each query frame having associated metadata characterizing the query frame, and each query frame comprising a plurality of meta-sections with descriptive textual information about the query frame, the plurality of meta-sections including a meta-section that characterizes a past predetermined amount of time for which a continuous query associated with the query frame is evaluated;

provide a query interface for formulating continuous queries of the multi-dimensional data streams, the multi-dimensional data streams comprising sequences of time-stamped data items or tuples across two or more dimensions that have a fixed schema or structure and arrive in a given time order, the continuous queries evaluating continuously as new data arrive on the multi-dimensional data streams;

receive, via the query interface, user-generated input specifying search criteria;

search for query frames having metadata matching the search criteria;

populate, using at least one query frame having metadata matching criteria, the query interface to generate a plurality of continuous queries;

execute the plurality of continuous queries against the multi-dimensional data streams; and modify the plurality of continuous queries at run-time.

2. The computer readable storage medium of claim 1, wherein the multi-dimensional data streams are maintained for the modification of the plurality of continuous queries.

3. The computer readable storage medium of claim 2, wherein each query frame comprises a query section for specifying a continuous query.

4. The computer readable storage medium of claim 3, wherein the query section comprises gaps to be populated by a user.

5. The computer readable storage medium of claim 4, wherein the executable instructions to populate the query interface comprise executable instructions to populate the plurality of query frames.

6. The computer readable storage medium of claim 5, wherein the executable instructions to populate the plurality of query frames comprise executable instructions to display a menu of choices for populating the gaps in the plurality of query frames.

7. The computer readable storage medium of claim 4, wherein the plurality of query frames are selected from the group comprising dimension query frames, source query frames, filter query frames, function query frames, and composite query frames.

8. The computer readable storage medium of claim 7, wherein the gaps in the dimension query frames comprise gaps for dimensions and abstraction levels for an aggregation query.

9. The computer readable storage medium of claim 7, wherein the gaps in the source query frames comprise gaps for a data source and fields within a multi-dimensional data stream stored in the data source.

10. The computer readable storage medium of claim 7, wherein the gaps in the filter query frames comprise gaps for criteria to filter out one or more tuples of a multidimensional data stream.

11. The computer readable storage medium of claim 7, wherein the gaps in the function query frames specify the operation to be performed in the query.

12. The computer readable storage medium of claim 2, wherein the plurality of query frames comprise an empty query frame, a partially filled query frame, and a complete query.

13. The computer readable storage medium of claim 2, further comprising executable instructions to associate each query frame with metadata.

14. The computer readable storage medium of claim 13, further comprising executable instructions to search for query frames with associated metadata.

15. The computer readable storage medium of claim 2, further comprising executable instructions to convert the continuous queries formulated in the plurality of query frames into a plurality of query plans.

16. A non-transitory computer readable storage medium, comprising executable instructions to:

provide a plurality of query frames for generating continuous queries of multi-dimensional data streams, the multi-dimensional data streams comprising sequences of time-stamped data items or tuples across two or more dimensions that have a fixed schema or structure and arrive in a given time order the continuous queries evaluating continuously as new data arrive on the multi-dimensional data streams, each query frame comprising a plurality of meta-sections with descriptive textual information about the query frame, the plurality of meta-sections including a meta-section that characterizes a past predetermined amount of time for which a continuous query associated with the query frame is evaluated;

store the plurality of query frames in a query catalog along with natural language descriptions characterizing the respective query frames;

receive user-generated input via a graphical user interface specifying search criteria;

search for query frames in the query catalog having natural language descriptions matching the search criteria;

populate the query frames matching the search criteria to generate populated query frames; and convert the populated query frames into continuous queries against the multi-dimensional data streams.

17. The computer readable storage medium of claim 16, wherein the search criteria are selected from the group comprising keyword search, query type search, query frame search, and user profile search.

18. The computer readable storage medium of claim 16, further comprising executable instructions to associate each query frame with metadata.

19. The computer readable storage medium of claim 18, wherein the metadata is selected from the group comprising query frame metadata, user profile metadata, and data source metadata.

20. The computer readable storage medium of claim 16, further comprising executable instructions to modify the continuous queries at run-time.

21. A method for facilitating the formulation of continuous queries, the method comprising:

providing a plurality of query frames for formulating continuous queries of multi-dimensional data streams, the multi-dimensional data streams comprising sequences of time-stamped data items or tuples across two or more dimensions that have a fixed schema or structure and arrive in a given time order the continuous queries evaluating continuously as new data arrive on the multi-dimensional data streams, each query frame comprising a plurality of meta-sections with descriptive textual information about the query frame, the plurality of meta-sections including a meta-section that characterizes a past predetermined amount of time for which a continuous query associated with the query frame is evaluated;

providing a graphical user interface for populating one or more of the plurality of query frames to generate populated query frames;

storing the populated query frames and metadata characterizing each of the populated query frames in a query catalog;

searching for query frames in the query catalog having corresponding metadata matching a search criteria, each continuous query of the continuous queries being configured to be formulated by a user without programming knowledge;

converting, based on the searching, the populated query frames into continuous queries; and executing the continuous queries against the multi-dimensional data streams.

22. The method of claim 21, further comprising modifying the continuous queries at run-time.

23. The method of claim 21, further comprising displaying the executing continuous queries to a user.

* * * * *